United States Patent Office 3,052,640
Patented Sept. 4, 1962

3,052,640
HYDROXY-SUBSTITUTED POLYETHERS, THEIR DERIVATIVES AND PREPARATION
Robert W. Martin, Lafayette, Calif., assignor to Shell Oil Company, a corporation of Delaware
No Drawing. Filed Dec. 14, 1955, Ser. No. 552,964
19 Claims. (Cl. 260—2)

This invention relates to new polyethers and their preparation. More particularly, the invention relates to new hydroxy-substituted polyethers containing one or more polyhydrocarbyl-substituted benzene rings, to a method for preparing these hydroxy-substituted polyethers from poly(halohydrocarbyl) or poly(hydroxyhydrocarbyl) poly(hydrocarbyl) benzenes, and to the use of the new hydroxy-substituted polyethers, particularly in the preparation of coatings and as polyols for preparing improved ester and ether products.

Specifically, the invention provides new and particularly useful hydroxy-substituted polyethers possessing at least two alcoholic OH groups and at least one benzene ring substituted with at least 3, and preferably 4, hydrocarbyl side chains, and joined through two of the remaining ring carbon atoms to carbon atoms of an ether containing radical. As a special embodiment, the invention provides hydroxy-substituted polyethers of the formula

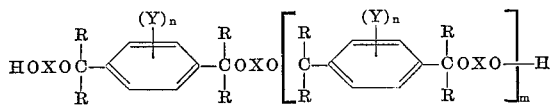

wherein Y is a monovalent hydrocarbon radical, X is a bivalent organic radical, R is hydrogen or a hydrocarbon radical, n is 3 to 4, and m is an integer from 0 to 50.

The invention further provides a novel method for preparing the above-described hydroxy polyethers which comprises heating and reacting a substituted poly(hydrocarbyl) benzene of the group consisting of poly-(halohydrocarbyl) poly(hydrocarbyl) benzenes and poly(hydroxyhydrocarbyl) poly(hydrocarbyl) benzenes, with appropriate amounts of a compound having at least two alcoholic OH groups, and particularly aliphatic and cycloaliphatic polyhydric alcohols.

It is an object of the invention to provide a new class of polyethers. It is a further object to provide new hydroxy-substituted polyethers containing one or more polyhydrocarbyl-substituted benzene rings, and a method for their preparation. It is a further object to provide new hydroxy-substituted polyethers which are particularly useful and valuable in the chemical and related industries. It is a further object to provide new polyhydroxy-substituted polyethers which are useful as polyols. It is a further object to provide new resinous hydroxy-substituted polyethers which may be cured with polymethylol compounds to form useful and valuable compositions. It is a further object to provide new hydroxy-substituted polyethers which may be used to give surface coatings which are hard and durable and have improved resistance to water and alkali. It is a further object to provide new resinous hydroxy-substituted polyethers which give coatings having improved heat resistance. It is a further object to provide new polyhydroxy-substituted polyethers which may be used as polyols in the preparation of valuable ester and ether derivatives. Other objects and advantages of the invention will be apparent from the following detailed description thereof.

It has now been discovered that these and other objects may be accomplished in part by the novel products of the invention which comprise hydroxy-substituted polyethers possessing at least two alcoholic OH groups and at least one benzene ring substituted with at least 3, and preferably 4, hydrocarbyl side chains, and joined through one of the remaining ring carbon atoms to the carbon atom of an ether containing radical.

The new hydroxy-substituted polyethers, due to their unique structural features, such as having the benzene rings with substantially and preferably all of their ring carbon atoms attached to carbon atoms, have been found to have many unusual and unexpected properties. It has been found, for example, that the new polyethers may be used to form surface coatings, either through cure with materials, such as amines, polymethylol compound, or by further reaction with materials, such as polybasic anhydrides, polyisocyanates, drying oils and the like, which are characterized by their hardness and durability, excellent resistance to solvents and alkali and by their good heat resistance. The new hydroxy polyethers are also useful in the formation of alkyd resins, polyurethanes, silicon polymers as well as monomeric ether and ester derivatives which are unusually good plasticizers and softening agents for polyvinyl resins, rubber and the like.

The products of the invention possess at least two hydroxyl groups and at least one benzene ring substituted with at least 3, and preferably 4, hydrocarbyl side chains joined through two of the remaining ring carbon atoms to carbon atoms of ether containing radicals, i.e. they will possess at least one unit having the structure

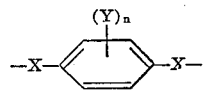

with the polymeric compounds possessing a plurality of structural units such as

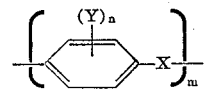

wherein Y is a hydrocarbon radical, n is an integer of 3 to 4, X is an organic radical containing an ether oxygen atom and m is an integer greater than 2.

Preferred products of the invention are those of the formula

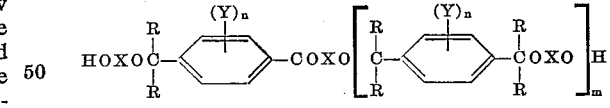

wherein Y is a monovalent hydrocarbon radical, X is a bivalent organic radical, R is hydrogen or a hydrocarbon radical, n is 3 to 4 and m is an integer from 0 to 50.

The Y in the above-described formula may be an aliphatic, cycloaliphatic or aromatic hydrocarbon radical, such as, for example, methyl, ethyl, butyl, hexyl, octyl, isopropyl, isobutyl, isooctyl, decyl dodecyl, hexadecyl, octadecyl, allyl, 3-octenyl, 4-hexenyl, cyclohexyl, cyclopentyl, cyclopentenyl, phenyl, methyphenyl, isopropylphenyl, and the like. Y is preferably an aliphatic hydrocarbon radical, and particularly an alkyl or cycloalkyl radical, containing no more than 14 carbon atoms, and preferably no more than two of the Y's contain over 8 carbon atoms.

X is a bivalent radical such as may be obtained by removing two hydroxyl groups from compounds possessing at least two alcoholic OH groups, such as the hereindescribed reactants and is preferably a bivalent hydrocarbon radical or a bivalent hydroxy-substituted hydrocarbon radical as derived from hydrocarbon diols or hydrocarbon polyols by removing two of the hydroxyl groups.

The hydrocarbon radicals represented by Y in the above-described formula may be aliphatic, cycloaliphatic or aromatic and may be saturated or unsaturated, such as, for example, methyl, ethyl, butyl, hexyl, octyl, isopropyl, isobutyl, decyl dodecyl hexadecyl octadecyl, allyl, 3-octenyl, 4-hexenyl, cyclohexyl, cyclopentyl, cyclopentenyl, phenyl, methylphenyl, isopropylphenyl, and the like. The hydrocarbons represented by Y are preferably aliphatic hydrocarbon radicals, and particularly alkyl and cycloalkyl radicals containing less than 8 carbon atoms.

Particularly preferred hydroxy-substituted polyethers, especially if they are to be used in the preparation of surface coatings are those of the formula

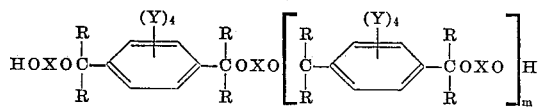

wherein Y is a monovalent alkyl or cycloalkyl radical containing no more than 8 carbon atoms, X is a bivalent hydrocarbon or hydroxy-substituted hydrocarbon radical containing no more than 18 carbon atoms, R is hydrogen or an alkyl radical, and $m$ is an integer from 1 to 30.

Coming under special consideration, particularly because of their ability to be used as resinous polyols are the polyhydroxy-substituted polyethers of the formula

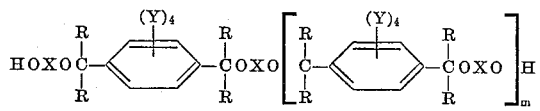

wherein Y is a monovalent alkyl or cycloalkyl radical containing no more than 8 carbon atoms, X is a bivalent hydrocarbon radical substituted with 1 to 4 hydroxyl groups and containing no more than 18 carbon atoms and R is hydrogen or alkyl radical, and $m$ is an integer from 1 to 30.

Preferred monomeric hydroxy-substituted polyethers are those of the formula

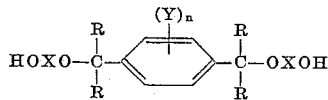

wherein Y is a monovalent alkyl or cycloalkyl radical containing no more than 8 carbon atoms, X is a bivalent hydrocarbon radical or hydroxy-substituted hydrocarbon radical containing no more than 18 carbon atoms and R is hydrogen or an alkyl radical, $n$ is 3 to 4. Examples of these preferred monomeric hydroxy-substituted polyethers include, among others, 1,4-bis(4-hydroxybutoxymethyl) tetramethylbenzene, 1,4 - bis(2 - hydroxyethoxymethyl) tetramethylbenzene, 1,3 - bis(2,3 - dihydroxypropoxymethyl) tetramethylbenzene, 1,4-bis(4,5-dihydroxyheptoxymethyl) tetraisopropylbenzene, 1,4-bis(4-hydroxybutoxymethyl) tetrahexylbenzene, 1,3 - bis(2,3,5 - trihydroxydecyloxymethyl) tetrabutylbenzene and 1,3 - bis(3-hydroxypentoxy-1-ethyl) tetrahexylbenzene.

The above-described hydroxy-substituted polyethers are prepared according to the present invention by heating and reacting a substituted hydrocarbyl benzene of the group consisting of poly(halohydrocarbyl) poly(hydrocarbyl) benzenes and poly(hydroxyhydrocarbyl) poly(hydrocarbyl) benzenes with appropriate amounts of a compound having at least two alcoholic OH groups.

The poly(halohydrocarbyl) poly(hydrocarbyl) benzenes that may be used in the process of the invention may be exemplified by the following: 1,4-bis(chloromethyl) tetramethylbenzene, 1,4-bis(1chloroethyl) tetraethyl benzene, 1,3-bis(1-bromoethyl) tetrabutylbenzene, 1,2-bis(1-chlorobutyl) tetraoctylbenzene, 1,4-bis(1-chloroheptyl)benzene, 1,3-bis(chloromethyl) tetradecylbenzene, 1,4 - bis-(chloromethyl) dibutyl dioctylbenzene, 1,3-bis(1-chloropentyl)dihexyl didecylbenzene, and 1,4-bis(chloromethyl) dihexenyl dioctyl benzene.

Preferred poly(halohydrocarbyl) poly(hydrocarbyl) benzenes to be employed in the process include those compounds having a benzene ring substituted, in the 1,4 position, with two chloro-substituted aliphatic hydrocarbon radicals which have the chlorine atom on the alpha carbon atom and preferably contain no more than 6 carbon atoms, and the remaining ring carbon atoms substituted with four separate hydrocarbon radicals which are preferably alkyl, cycloalkyl, alkcycloalkyl and alkenyl radicals containing no more than 10 carbon atoms. Particularly preferred are the bis(chloromethyl) tetraalkylbenzenes.

The poly(halohydrocarbyl) poly(hydrocarbyl) benzenes may be obtained by halogenating a poly(hydrocarbyl)-benzene by conventional methods. Bis(chloromethyl) tetramethylbenzene is prepared, for example, by chlorinating hexamethylbenzene. The preferred bis(chloromethyl) hydrocarbyl benzenes are preferably obtained by reacting the poly(hydrocarbyl)benzenes having at least two ring carbon atoms unsubstituted, such as tetramethylbenzene (durene), with formaldehyde and hydrogen chloride. The poly(hydrocarbyl)benzenes may be obtained by alkylating benzene with the desired hydrocarbon in the presence of an alkylating agent, such as hydrogen fluoride, as described in U.S. 2,275,312.

The poly(hydroxyhydrocarbyl) poly(hydrocarbyl) benzenes that are used in the process of the invention may be exemplified by the following: 1,4-bis(hydroxymethyl) tetramethylbenzene, 1,3 - bis(hydroxymethyl) tetrabutylbenzene, 1,2 - bis(1 - hydroxyethyl) tetraocytylbenzene, 1,4 - bis(hydroxymethyl) tetraethylbenzene, 1,3 - bis(hydroxymethyl) tetradecylbenzene, 1,3-bis(1-hydroxybutyl) tetrahexylbenzene, 1,4-bis(hydroxymethyl) tetracyclohexylbenzene and 1,3-bis(hydroxymethyl) dimethyl didecyl benzene.

Preferred poly(hydroxyhydrocarbyl) poly(hydrocarbyl) benzenes that may be used in the process of the invention include those compounds having a benzene ring substituted, on the 1,4 positions, with two hydroxy-substituted aliphatic hydrocarbon radicals which have the hydroxy group substituted on the alpha carbon atom and preferably contain no more than 6 carbon atoms, and the remaining ring carbon atoms substituted with four separate hydrocarbon radicals which are preferably alkyl, cycloalkyl, alkcycloalkyl and alkenyl radicals containing no more than 10 carbon atoms. Particularly preferred are the 1,4 bis(hydroxymethyl) tetraalkyl benzenes.

The above-described poly(hydroxyhydrocarbyl) polyhydrocarbyl)-benzenes are preferably obtained by hydrolysis of the above-described polyhalohydrocarbyl substituted benzenes. Bis(hydroxymethyl) tetramethylbenzene, for example, is obtained by reacting bis(chloromethyl) tetramethylbenzene with aqueous caustic solution in the presence of a water miscible solvent.

The material to be reacted with the above-described aromatic derivatives comprise compounds having at least two alcoholic OH groups. These compounds may have the OH groups attached to aliphatic or cycloaliphatic radicals which in turn may be substituted with various substituents, such as aromatic radicals, heterocyclic radicals, halogen atoms, ether radicals, ester radicals and the like. Examples of these compounds include, among others, ethylene glycol, diethylene glycol, triethylene glycol, 1,5-pentanediol, 1,6-hexanediol, 3-ethylhexanediol-1,3, glycerol allyl ether, glycerol phenyl ether, butanediol-1,4, thiodipropanol, sulfonyldipropanol, glycerol monoacetate, 2,5-dimethyl-2,6-heptanediol, glycerol hexanetriol, pentaerythritol, mannitol, methyltrimethylolmethane, 1,4,6-octanetriol, polypentaerythritol, polyallyl alcohol, polyvinyl alcohol, 1,2,5 - trihydroxycyclohexane, 3-octenetriol-1,2,8, 3-cyclohexenediol-1,5, 3,5-dithiooctanetriol, polyols formed by the condensation of bisphenols with epichlorohydrin, such as described in U.S. 2,500,449, and 1,2-dihydroxy materials obtained by the hydrolysis of polyepoxides, such as butadiene dioxide, diglycidyl ether, epoxidized triglycerides, diglycidyl ether of bis-phenol-A, diglycidyl ether of resorcinol and the like and hydroxy-terminated polyethers and polyesters.

The exact hydroxy-containing material selected will depend upon the desired utility. Linear thermoplastic polyethers are obtained by using dihydric alcohols and preferably aliphatic and cycloaliphatic dihydric alcohols, such as, for example, ethylene glycol, diethylene glycol, triethylene glycol, 1,5-pentanediol, hexanediol-1,6, 3-ethyl hexanediol-1,3, glycerol monoallyl ether, 2,4-butadiene-1,4-diol, 2,8-dodecanediol, thiodipropanol, sulfonyldipropanol, glycerol monobutyrate, 2,5-dimethyl-2,6-heptanediol and the like. Preferred members of the group comprise the aliphatic and cycloaliphatic dihydric alcohols having from 2 to 10 carbon atoms, and more preferably the alkanediols and cycloalkanediols containing up to 10 carbon atoms. Insoluble infusible coatings are obtained by using alcohols having at least three and preferably 3 to 6 hydroxyl groups, such as glycerol, 1,2,6-hexanetriol, pentaerythritol, polyallyl alcohol, polyvinyl alcohol, mannitol, methyltrimethylolmethane, 1,4,6-octanetriol, and the like. Preferred members of this group comprise the aliphatic and cycloaliphatic alcohols having from 3 to 6 hydroxyl groups and not more than 12 carbon atoms, and especially the alkanetriols and the cycloalkanetriols containing up to 8 carbon atoms. Curable coating may also be obtained by using alcohols having unsaturated linkages, such as, for example, glycerol allyl ether, 2-butanediol-1,4, 2-(hydroxymethyl)-1-propen-3-ol, 1-penten-3,5-diol, 1-penten-3,4-diol, 1,5-hexadiene-3,4-diol, 2-(hydroxymethyl)2-buten-4-ol, 1-heptene-4,6,7-triol, cyclohexenediol-1,2,5 and 2,6-dimethyl-7-octene-2,3,6-triol and monoglycerides, such as glycerol monolinseedate, glycerol monooleate, and glycerol monolinoleate. Preferred members of this group comprise the aliphatic and cycloaliphatic ethylenically unsaturated alcohols having from 4 to 10 carbon atoms, alkenyl ethers of aliphatic and cycloaliphatic polyhydric alcohols containing from 2 to 10 carbon atoms, and monoglycerides as $C_{12}$ to $C_{24}$ ethylenically unsaturated monocarboxylic acids.

If one desires polyether products having long side chains which may be of use as surface active agents, detergents and additives for lubricating oils, they should preferably utilize an alpha,beta dihydroxyl material, and particularly those obtained by the hydrolysis of terminal epoxy materials, such as, for example, 1,2-dihydroxydodecane, 1,2-dihydroxyoctadecane, 1,2-dihydroxyeicosane, 1,2-dihydroxypropoxy octadecane, 1,2-dihydroxypropoxydodecane, 1,2-dihydroxypropoxyoctadecene and the like, and mixtures thereof. Preferred members of this group comprise the alpha,beta dihydroxy-substituted aliphatic and cycloaliphatic hydrocarbons containing up to 24 carbon atoms.

The proportions in which the substituted benzene and the material having the alcoholic OH groups are combined may vary over a wide range depending upon the type of product desired. The high molecular weight products are obtained by combining the reactants in approximately chemical equivalent amounts. The expression "chemical equivalent amounts" as used herein in relation to the amount of substituted benzene and the material having the alcoholic OH groups refers to that amount of the substituted benzene needed to furnish one halohydrocarbyl group or hydroxy hydrocarbyl group for every alcoholic OH group.

The lower molecular weights are obtained by employing the material having the alcoholic OH groups in excess and carefully controlling the reaction conditions. Theoretical proportions needed to obtain the various types of products are illustrated below in case of the reaction of bis(chloromethyl) durene with glycerine:

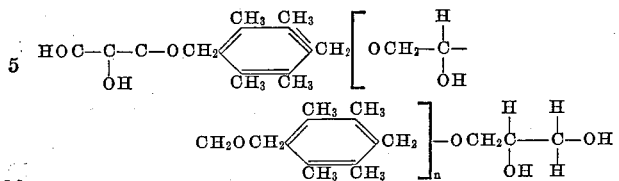

| n | G/BHMD | M.W. | OH eq./100 g. | OH group/mole |
|---|---|---|---|---|
| 0 | 2:1 | 342 | 1.165 | 4 |
| 1 | 3:2 (1.5:1) | 592 | .847 | 5 |
| 2 | 4:3 (1.33:1) | 842 | .712 | 6 |
| 3 | 5:4 (1.25:1) | 1,092 | .642 | 7 |
| 4 | 6:5 (1.2:1) | 1,342 | .596 | 8 |
| 5 | 7:6 (1.165:1) | 1,592 | .566 | 9 |
| 6 | 8:7 (1.14:1) | 1,842 | .542 | 10 |

G = glycerine.
BHMD = bis(chloromethyl)durene.

The reaction may be accomplished in the presence or absence of catalytic material. Best results are obtained with the bis(hydroxy hydrocarbyl) polyhydrocarbyl benzenes by using small amounts, e.g. 0.1% to 2% by weight, of an acidic catalyst such as, for example, p-toluenesulfonic acid and sulfamic acid.

The reaction may be accomplished in the presence or absence of solvents or diluents. If solvents or diluents are employed, they are preferably the polyhalogenated hydrocarbons, such as tetrachloroethane, hexachloropropane and carbon tetrachloride. Benzene, toluene and dioxane have also been used. Chlorinated aromatic compounds as di- and tri-chlorobenzene are particularly preferred as solvents.

If the substituted benzene reactant is a poly(halohydrocarbyl) poly(hydrocarbyl) benzene, hydrogen halide will be formed during the reaction. The formed hydrogen halide may be removed by bubbling air or nitrogen through the mixture or by addition of materials such as $Na_2CO_3$ or $K_2CO_3$ or epoxy materials as epichlorohydrin, which react with the formed HCl. If the reactant is a poly(hydroxy hydrocarbyl) poly(hydrocarbyl) benzene, water will be formed in the reaction. This can be easily removed by use of high reaction temperatures and venting or use of condensers.

The temperature used to effect the reaction may also vary over a considerable range. In general, temperatures employed in the process will vary from about 50° C. to about 350° C. If one or more of the reactants are solids or semi-solids, or if one desires to remove water formed in the reaction as indicated above, the higher reaction temperatures, such as 100° C. to 350° C. are generally employed. Preferred temperatures generally range from 100° C. to 250° C. Pressures employed may be atmospheric, subatmospheric or superatmospheric as desired or necessary.

If the reactant has three or more alcoholic OH groups, there may be danger of gelation and care should be taken to avoid such action. This may be avoided by not overheating and not heating too long, or by proper control of the mole ratios of reactants.

The resinous products produced by the above process may be recovered by any conventional method. They are preferably recovered as by filtration or as bottoms product by stripping off the solvent and any excess reactants or by precipitation in a non-solvent.

The resinous products of the present invention vary from thick viscous liquids to high melting solids. The molecular weight of the products will range from about 600 to as high or higher than 10,000. The solubility of the products will depend upon molecular weight and the side chain structure. Low molecular weight products and many of the products having long aliphatic side chains are generally soluble in alcohols and ketones. The high molecular weight products are usually soluble only in polychlorinated hydrocarbons, such as dichlorobenzene, chloroform and tetrachloroethane.

The new hydroxy-containing polyethers are particularly valuable in the preparation of improved coating and impregnating compositions. In these applications they may be applied as a melt or may be dissolved in suitable solvents, such as polychlorinated materials, as chloroform, dichlorobenzene, tetrachloroethane, and the like, and mixtures thereof. Other high molecular weight resinous film-forming materials compatible therewith may also be employed in the preparation of these compositions. The resulting compositions may be painted, sprayed or otherwise applied to suitable surfaces such as metals and wood. Films prepared from these resinous polyethers are particularly outstanding as they are hard and tough and have good resistance to water, alkali and solvents.

The resinous polyethers prepared from the compounds having three or more hydroxyl groups and those prepared from alcohols possessing ethylenic unsaturation are particularly preferred in the formation of coatings as they may be subsequently cured through heat or in the presence of curing or cross-linking agents, such as acidic curing agents, methylol melamine, methylol phenol and ureas, to form insoluble, infusible coatings. These materials are especially suitable for use in preparing baked films.

The resinous polyethers prepared from the compounds having three or more hydroxyl groups and those prepared from alcohols possessing ethylenic unsaturation also find wide application in the preparation of valuable derivatives. Thus, the polyethers prepared from the alcohols having more than three hydroxyl groups may be used as resinous polyols and further reacted with drying oil fatty acids to prepare resinous polyethers for air-drying coatings. The resinous polyols may, for example, be reacted with polyethylenic monocarboxylic acids, such as acids derived from linseed, soybean, perilla, oiticica, tung, walnut and dehydrated castor oil, lower unsaturated acids, such as pentadienoic, hexadienoic and decadienoic acid, rosin acids, as abietic acid, pimaric acid and the like, to produce products which are of value in the preparation of coating compositions, such as varnishes.

The resinous polyols of the invention are also of considerable value in the preparation of modified alkyd resins. In this case they are reacted with a suitable polycarboxylic acid or anhydride and the desired modifying agent. Preferred polycarboxylic acids to be used for this purpose include the unsubstituted dicarboxylic acid containing no more than 16 carbon atoms such as, for example, the alkanedioic, cycloalkanedioic, aromatic hydrocarbon dicarboxylic acids and the alkyl-substituted aromatic hydrocarbon dicarboxylic acids such as, for example, phthalic acid, isophthalic acid, terephthalic acid, adipic acid, sebacic acid, cyclohexanedicarboxylic acid, maleic acid, fumaric acid, itaconic acid, 1,8-naphthalenic acid, and mixtures thereof. Suitable modifying agents include, among others, monohydric alcohols such as, for example, allyl alcohol, butyl alcohol, octyl alcohol and decyl alcohol, monocarboxylic acids such as, for example, butyric acid, capric acid, cyclohexanecarboxylic acid, benzoic acid, p-tert-butyl-benzoic acid, 3,5-di-tert-butyl-benzoic acid, fatty acids derived from natural oils, as drying and semi-drying oils and non-drying oils, such as linseed, soybean, perilla, tung, walnut, pineseed, olive, oiticica, corn, cottonseed, coconut, hemp seed, mustard and the like. Particularly preferred modifiers comprise the non-drying oil, semi-drying oil and drying oil fatty acids.

The resinous polyols may also be reacted with polyisocyanates to form polyurethane resins which are useful as rubbers, and the resinous polyols containing ethylenic linkages may also be homopolymerized or copolymerized with other unsaturated compounds by heating in the presence of a peroxide catalyst.

The resinous polyethers prepared from the alpha,beta-glycols, such as 1,2-dihydroxydodecane have long hydrocarbon side chains which are oil soluble and such materials are of value as pour point depressants and detergents for various lubricating oils and compositions and anti-clogging agents for fuel oils.

The lower molecular weight polyol may also be esterified with monocarboxylic acids or etherified with monohydric alcohol to form esters and ethers which have valuable properties as plasticizers and softening agents for rubbers and vinyl resins, such as poly(vinyl chloride), vinyl chloride-vinyl acetate copolymers, vinylidene chloride polymers, polystyrene, polyacrylonitrile, polydiallylphthalate, and the like. Examples of such acids include, among others, butyric, caproic, enanthic, pelargonic, capric, lauric, stearic, palmitic, acrylic, methacrylic, cyclohexanecarboxylic, cyclopentanoic, benzoic, toluic, tert-butylbenzoic, isopropylbenzoic and the like acids. Preferred esters are the esters of the monomeric polyols and aliphatic and cycloaliphatic acids containing from 4 to 15 carbon atoms.

The monohydric alcohols used in making the ethers may be emplified by methyl alcohol, butyl alcohol, isooctyl alcohol, decyl alcohol, allyl alcohol, cyclohexanol, benzyl alcohol, chloroallyl alcohol, furfuryl alcohol and the like. Preferred alcohols are the aliphatic and cycloaliphatic alcohols containing from 4 to 12 carbon atoms.

The resinous polyethers of the present invention may also be hydrogenated to form aliphatic-type resins having improved solubility characteristics, and may be halogenated to form other useful and valuable products.

To illustrate the manner in which the invention may be carried out, the following examples are given. It is to be understood, however, that the examples are for the purpose of illustration and the invention is not to be regarded as limited to any of the specific conditions or reactants recited therein. Unless otherwise specified, parts described in the examples are parts by weight.

*Example I*

This example illustrates the preparation of a linear polymeric polyether from ethylene glycol and 1,4-bis(chloromethyl)tetramethylbenzene using $K_2CO_3$ to take up the liberated hydrogen chloride.

4.62 parts of 1,4-bis(chloromethyl)tetramethylbenzene and 3.0 parts of $K_2CO_3$ were mixed together and then added to a reaction flask containing 3.0 parts of ethylene glycol. The resulting mixture was heated to 200° C. for 15 minutes. There was a vigorous evolution of carbon dioxide during the first few minutes but that stopped in about 15 minutes. 50 parts of acetic acid was added and the solution boiled. The mixture was then poured into 600 parts of water and a white precipitate formed. The precipitate was removed and dried. This polymer had a molecular weight of 740, hydroxyl value of .387 eq./100 g. and a chlorine content of .01%. The polymer softened at 150–155° C. and formed a low viscosity melt at 190° C. to 200° C. On cooling the melt formed a hard transparent film.

Related polymers are obtained by replacing the 1,4-bis(chloromethyl)tetramethylbenzene in the above process with equivalent amounts of each of the following: 1,4-bis(chloromethyl)ethyl trimethylbenzene, 1,3-bis(chloromethyl)tetraethylbenzene and 1,4-bis(1-chloroethyl)tetrabutylbenzene.

*Example II*

This example illustrates the preparation of a linear polymeric polyether from 1,5-pentanediol and 1,4-bis(hydroxymethyl)tetramethylbenzene.

2.08 parts of 1,5-pentanediol and 3.88 parts of bis(hydroxymethyl)tetramethylbenzene were mixed and heated to 255° C. 0.1 part of 5% solution of sulfamic acid was added. The reaction mixture was held at 255° C. to 315° C. for about 1 hour and then poured into a cup and allowed to solidify. The resulting product was a yellow waxy solid which was stable up to 250° C.

Example III

This example illustrates the preparation of a linear polymeric polyether from glycerol monooleate and 1,4-bis(hydroxymethyl)tetramethylbenzene.

36 parts of glycerol monooleate, 0.3 part of p-toluenesulfonic acid and 50 parts of toluene were added to a reaction flask equipped with a stirrer, thermometer and condenser. The mixture was heater to reflux (107° C.) and then 15.5 parts of 1,4-bis(hydroxymethyl)tetramethylbenzene added. In about 30 minutes the viscosity began to increase and the mixture turned a light tan color. The reaction product was then transferred to a beaker, boiled in toluene and mixed with fuller's earth and filtered. Yield of product was about 86%. Ester value of 0.204 eq./100 g.

Example IV

This example illustrates the preparation of a linear polymeric polyether from ethylene glycol and 1,4-bis(hydroxymethyl)tetramethylbenzene.

1.24 parts of ethylene glycol and .005 part of sulfamic acid were placed in a reaction flask and the mixture heated by immersion in a heated bath held at 240° C. 3.88 parts of 1,4-bis(hydroxymethyl)tetramethylbenzene were added in small portions over 45-minute period. The mixture was then heated for one hour at 240° C. The resulting product was a tan hard resin softening at 200° C.–215° C. OH value of .194 eq./100 g.

Example V

This example illustrates the preparation of a resinous polyether from glycerol and 1,4-bis(chloromethyl)tetramethylbenzene using epichlorohydrin to take up the liberated HCl.

About 23 parts of 1,4-bis(chloromethyl)tetramethylbenzene, 70 parts of glycerine, 80 parts of dioxane and 17 parts of epichlorohydrin were placed in a reaction flask and heated upwards from 76° C. to 119° C. for 3 hours and then held at 119° C. for two hours. The reaction was stopped at that time and the excess glycerine, epichlorohydrin and dioxane removed by distillation. The resulting product was a pale tan colored resinous product having a molecular weight of 820 and a total OH content of 0.730 eq./100 g.

Related polymers are obtained by replacing the 1,4-bis(chloromethyl)tetramethylbenzene in the above process with equivalent amounts of each of the following: 1,4-bis(chloromethyl)ethyl tributylbenzene and 1,3-bis-(1-chloroethyl)tetraethylbenzene.

Example VI

This example illustrates the preparation of a linear polyether from ethylene glycol and 1,4-bis(chloromethyl)-tetramethylbenzene using nitrogen to remove the hydrogen chloride.

23.1 parts of 1,4-bis(chloromethyl)tetramethylbenzene, 100 parts of ethylene glycol and 150 parts of tetrachloroethane were placed in a reaction flask equipped with a gas inlet tube. Nitrogen was introduced while the contents of the flask were stirred and heated to reflux. At the end of 1.5 hours, the reaction was essentially complete and the excess glycol and solvent removed by vacuum distillation. The resulting product was white solid polymer, M.P. 162–166° C. Yield 25.6 parts. Total hydroxyl 0.438 eq./100 g. Chlorine=0.59%. M.W. 452.

Example VII

This example illustrates the preparation of a polymeric polyether from glycerol and 1,4-bis(hydroxymethyl)tetramethylbenzene using benzene as the solvent and p-toluenesulfonic acid as the catalyst.

10 parts of benzene, 76 parts of glycerol and 0.3 part of p-toluenesulfonic acid were added to a reaction vessel equipped with stirrer, condenser, thermometer and Stark and Dean trap. The mixture was heated to a kettle temperature of 81.2° C. and 38.8 parts of 1,4-bis(hydroxymethyl)tetramethylbenzene added and the temperature maintained between about 84° C. and 101° C. Additional benzene was added periodically to keep the temperature within this range. After about 2 hours of heating, the reaction mixture was cooled and transferred with 100 parts of acetone into 200 parts of water containing 0.5 part of sodium bicarbonate. The acetone and benzene were boiled off. The product was then cooled to 25° C. and the water decanted leaving a cream colored resin. This resin when recrystallized had a melting point of 116–120° C., a mol weight of 608 and an OH value of 0.83 eq./100 g.

Example VIII

This example illustrates the preparation of a polyether from 1,4-bis(chloromethyl)tetramethylbenzene and glycerol using nitrogen to remove the hydrogen chloride.

46 parts of 1,4-bis(chloromethyl)tetramethylbenzene, 27 parts of glycerol and 75 parts of dioxane were placed in a reaction kettle equipped with a gas inlet tube. Nitrogen was introduced while the mixture was stirred and heated to reflux. At the end of about 3 hours, the reaction was essentially complete and the excess glycerol and dioxane were removed by vacuum distillation. The resulting product was a white solid polymer having a mol weight of 584 and an OH value of 0.70 eq./100 g.

Example IX

This example illustrates the preparation of a polyether from 1,4-bis(chloromethyl)tetramethylbenzene and 1,1,1-trimethylolethane.

24 parts of trimethylolethane, 26 parts of anhydrous sodium carbonate, 46 parts of 1,4-bis(chloromethyl)tetramethylbenzene and 40 parts of dioxane were charged into a reaction kettle equipped with a stirrer, reflux ratio control distilling head and thermometer. Heat was applied slowly and the mixture stirred. The temperature was raised to about 98° C. in an hour and then held within the range of 98–109° C. for about 10 hours. The contents of the kettle was then poured into water and then washed several times in water. The polymer which was a light brown solid was then dried. It had a mol weight of 711, an OH value of 0.455 eq./100 g. Chlorine=0.31%.

Example X

This example illustrates the preparation of a hydroxy-containing polyether from 1,4-bis(chloromethyl)tetramethylbenzene and 1,2,6-hexanetriol.

28.84 parts of 1,2,6-hexanetriol, 26 parts of anhydrous sodium carbonate, 46.20 parts of 1,4-bis(chloromethyl) tetramethylbenzene and 40 parts of dioxane were charged into a reaction kettle equipped with stirrer, condenser and thermowell. Heat was applied slowly and the mixture stirred. In about an hour the temperature had reached about 98° C. and then held within the range of 98° C. to 101° C. for about 12 hours. The contents of the kettle was then poured into water and dioxane and steam distilled off. The resulting polymer was then extracted with boiling water until the filtrate was no longer basic. The polymer, which was a light brown solid, was then dried. The polymer had a molecular weight of 908, an OH value of 0.55 eq./100 g. and a chlorine content of 1.1%.

Related polyethers are obtained by replacing the 1,2,6-hexanetriol with equivalent amounts of each of the following: 1,3,5-hexanetriol, 1,3,6-decanetriol and 1,2,8-octanetriol.

Example XI

This example illustrates the preparation of a hydroxy-containing polyether from 1,4-bis(hydroxymethyl)tetramethylbenzene and dipropylene glycol.

227 parts of dipropylene glycol, 100 parts of benzene, 1 part of p-toluenesulfonic acid were added to a reaction flask equipped with stirrer, thermometer, Stark and Dean trap and a condenser. The mixture was heated to a temperature of about 96–104° C. and then 25 parts of bis-(hydroxymethyl)tetramethylbenzene added to the flask. 25 parts of bis(hydroxymethyl)tetramethylbenzene were again added after every 2 hours until 75 parts had been added. At the end of the reaction, 2 parts of sodium bicarbonate in 50 parts of water were added and the mixture transferred to a distillation flask where the benzene, water and unreacted dipropylene glycol were distilled off. The crude product was then dissolved in boiling toluene and decolorized with fuller's earth and charcoal. The toluene solution was then distilled at 180° C. in 1 mm. Hg to yield a yellow highly viscous oil. Analysis showed a mol weight of 521, hydroxyl content of 0.384 eq./100 g.

*Example XII*

This example illustrates the preparation of a hydroxy-containing polyether from 1,4-bis(hydroxymethyl)tetramethylbenzene and diethylene glycol.

212 parts of diethylene glycol, 100 parts of benzene and 1 part of p-toluenesulfonic acid were added to a reaction flask described in the preceding example. The mixture was heated to 80–81° C. and then 94 parts of 1,4-bis(hydroxymethyl)tetramethylbenzene added in 4 portions of 23.5 parts each in periods of about 2 hours each. At the end of the reaction, 1 part of sodium bicarbonate in water was added and the mixture transferred to a distillation flask where the benzene, water and unreacted diethylene glycol were removed. The crude product was then dissolved in toluene, decolorized and the mixture distilled at 180° C. at 1 mm. The resulting product was a viscous liquid having a mol weight of 505 and an OH value of 0.431 eq./100 g.

*Example XIII*

This example illustrates the preparation of several hydroxy-containing polyethers from 1,4-bis(hydroxymethyl)tetramethylbenzene and neopentyl glycol.

214 parts of neopentyl glycol, 100 parts of benzene and 1 part of p-toluenesulfonic acid were added to a reaction flask as described in Example XI. The mixture was heated to 80–86° C. and then 100 parts of 1,4-bis(hydroxymethyl)tetramethylbenzene added in two 50 part portions. After about 8 hours the reaction was stopped and 2 parts of sodium bicarbonate in water added. The mixture was then transferred to a distillation flask and the benzene, water and unreacted glycol removed at a kettle temperature of 200° C. at 1 mm. Hg. The product was dissolved in toluene, decolorized as in Example XI and the mixture distilled at 200° C. at 1 mm. Hg. The resulting product was a clear amber colored solid. Analysis showed a mol weight of 474, an OH value of 0.437 eq./100 g., a softening point of 77° C., and a clear melting point of 107–109° C. The product was swollen by hot petroleum ether and soluble in benzene, toluene and hot xylene.

The above process was repeated wherein the 1,4-bis(hydroxymethyl)tetramethylbenzene and glycol were combined in a ratio of 1:3 instead of 1:4. In that case, the product had a mol weight of 677 and an OH value of 0.284 eq./100 g.

The above process was also repeated wherein the 1,4-bis(hydroxymethyl)tetramethylbenzene and glycol (mixture of neopentyl glycol and ethylene glycol) were combined in a ratio of 1.065:0.645). This product was a solid polymer having a molecular weight of 1076 and an OH value of 0.13 eq./100 g.

Related products are also obtained by replacing the 1,4-bis(hydroxymethyl)durene in the above processes with equal amounts of each of the following: 1,4-bis(chloromethyl)ethyltrimethylbenzene, 1,3-bis(1-chlorobutyl)tetramethylbenzene and 1,4-bis(chloromethyl)tetrabutylbenzene.

*Example XIV*

This example illustrates the preparation of a curable high molecular weight polymer from glycerol and 1,4-bis(hydroxymethyl)tetramethylbenzene.

3.88 parts of 1,4-bis(hydroxymethyl)tetramethylbenzene were combined with 1.5 parts of glycerol and .05 part of zinc chloride and the mixture heated at 150° C. for 3 hours. 20 parts of tetrachloroethane was added to the mixture and the mixture heated again at 150° C. for 30 minutes. The resulting solution which was now quite thick was spread on glass panels and cured at 190° C. for about 40 minutes. The resulting films were hard, clear and durable.

*Example XV*

This example illustrates the preparation of a curable high molecular weight polymer from 1,2,6-hexanetriol and 1,4-bis(hydroxymethyl)tetramethylbenzene.

6.0 parts of 1,2,6-hexanetriol, 0.2 part of a 5% solution of sulfamic acid and 40 parts of tetrachloroethane were placed in a reaction kettle equipped with stirrer and vent for elimination of water. 13.1 parts of 1,4-bis(hydroxymethyl)tetramethylbenzene were added and the mixture was stirred and heated at 160° C. for 5 hours. The resulting solution was diluted with chloroform and filtered hot to give a pale amber solution of the polymer. This solution was spread on glass panels and cured at 180° C. for 30 minutes. The resulting films were hard, clear and had good adhesion and were tough.

*Example XVI*

This example illustrates the preparation of 1,4-bis(beta-hydroxyethoxymethyl)tetramethylbenzene by reacting 1,4-bis(hydroxymethyl)tetramethylbenzene with ethylene glycol.

910 parts of ethylene glycol, benzene and 1 part of p-toluenesulfonic acid as a catalyst were added to a reaction flask as noted in the above examples. After heated to a temperature of 98–103° C., 1,4-bis(hydroxymethyl)-tetramethylbenzene was added in 10 part portions in periods of about 2 hours apart until 80 parts had been added. At the end of the reaction, sodium bicarbonate in water was added. The mixture was transferred to distillation flask and the water, benzene and unreacted ethylene glycol removed under reduced pressure. The resulting solid was extracted with water and crystallized from toluene. The product had an OH value of 0.73 eq./100 g. (theory 0.709), and a melting point of 97–100° C. The structure of the compound was

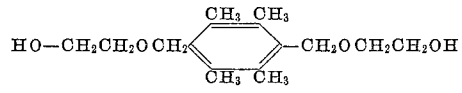

*Example XVII*

This example illustrates the preparation of a butyric acid ester of the 1,4-bis(beta-hydroxyethoxymethyl)tetramethylbenzene produced in the preceding example.

50 parts of 1,4-bis(beta-hydroxyethoxymethyl)tetramethylbenzene and 120 parts of butyric anhydride were placed in a reaction flask and refluxed for 1.5 hours at 180° C. A vacuum was applied and the volatile components removed up to a temperature of 180° C. at 2 mm. The resulting product was a viscous liquid that partly solidified to an opaque brown solid ester. The debutyrate of the 1,4-bis(beta-hydroxyethoxymethyl)tetramethylbenzene had an ester value of 0.455 eq./100 g. (theory 0.474).

This ester is valuable as a plasticizer for poly(vinyl chloride).

*Example XVIII*

This example illustrates the preparation of a 2-ethylhexanoic acid ester of the 1,4-bis(beta-hydroxyethoxymethyl)tetramethylbenzene produced in Example XVI.

50 parts of bis(beta-hydroxyethoxymethyl)tetramethylbenzene, 102 parts of 2-ethylhexanoic acid and 5 parts of xylene were added to a reaction flask equipped with stirrer, thermometer, gas inlet tube, Stark and Dean trap and condenser. Heat was applied and nitrogen was bubbled through the reaction mixture. The mixture was heated at 212–238° C. for about 11 hours. The mixture was then transferred to a distillation flask and the excess xylene and 2-ethylhexanoic acid distilled off to a kettle temperature of 230° C. at 1 mm. The diester was then dissolved in toluene and redistilled at a kettle temperature of 250° C. at 1 mm. Hg. The resulting product was tan colored, semi-solid diester having an ester value of 0.336 eq./100 g. (theory 0.375).

Example XIX

This example illustrates the preparation of a pelargonic acid ester of the 1,4-bis(beta-hydroxyethoxymethyl)tetramethylbenzene produced in Example XVI.

40 parts of the bis(beta-hydroxyethoxymethyl)tetramethylbenzene, 80 parts of pelargonic acid and 50 parts of xylene were placed in a reaction flask as described in the preceding example and the mixture heated at 140° C. up to 250° C. over a period of about 5 hours. The reaction mixture was then distilled as noted in the preceding example to yield an amber colored liquid. The dipelargonic ester had an ester value of 0.354 eq./100 g. compared to a theoretical value of 0.356.

This ester is suitable as a plasticizer for poly(vinyl chloride).

Example XX

A stearic acid ester of 1,4-bis(beta-hydroxyethoxymethyl)tetramethylbenzene was prepared by following the procedure shown in the preceding example. The resulting product was a solid having an ester value of 0.229 eq./100 g.

Example XXI

This example illustrates the preparation of a silicon polymer from 1,4-bis(beta-hydroxyethoxymethyl)tetramethylbenzene.

28.2 parts of the bis(beta-hydroxyethoxymethyl)tetramethylbenzene and 17.6 parts of dimethyldiacetoxysilane were mixed in a reaction flask equipped with a column and distilling head. The flask was heated in a metal bath at a temperature of 190° C. to 285° C. for about 3 hours. The mixture was then distilled to yield a liquid polymeric product having a mol weight of 1497.

Example XXII

This example illustrates the preparation of monomeric 1,4-bis(beta,gamma-dihydroxypropoxymethyl)tetramethylbenzene from 1,4-bis(hydroxymethyl)tetramethylbenzene and glycerol.

184 parts of glycerol, 500 parts of benzene and 1 part of toluenesulfonic acid were added to a reaction flask as noted in the above examples. After heating to a temperature of about 93° C., a total of 194 parts of 1,4-bis(hydroxymethyl)tetramethylbenzene were added portionwise in portions of about 25 parts each. At the end of the reaction, sodium bicarbonate in water was added. The mixture was transferred to distillation flask and the water, benzene and unreacted glycerine removed under reduced pressure. The resulting solid was extracted with boiling methylethyl ketone, cooled and filtered. The resulting product had an OH value of 1.23 eq./100 g. (theory 1.17).

Example XXIII

The butyric acid, pelargonic acid and caproic acid esters of 1,4-bis(beta,gamma-dihydroxypropoxymethyl)tetramethylbenzene are prepared by the process shown in Examples XVII to XIX. The resulting viscous liquids to solids are valuable as plasticizers for poly(vinyl chloride).

Example XXIV

This example illustrates the preparation of soya oil fatty acid ester of a polymeric polyether prepared from glycerol and 1,4-bis(hydroxymethyl)tetramethylbenzene.

27.8 parts of soya oil fatty acids and 25 parts of a polymeric polyether of glycerol and 1,4-bis(hydroxymethyl)tetramethylbenzene prepared by the method of Example VII and having an OH value of 0.494 eq./100 g. and a mol weight of 1778 were combined together and heated at a temperature of 205° C.–225° C. until the acid number had been reduced to 8.75. The resulting product which was a viscous liquid was then diluted with xylene and filtered. 0.04% cobalt drier was added to the xylene solution (44% solids) and the solution spread out on glass panels. The coatings dried to form a hard resistant film.

Example XXV

This example illustrates the preparation of coatings from the polymeric polyethers of the present invention using urea-formaldehyde or melamine-formaldehyde resins.

3 parts of a polymeric polyether of glycerol and 1,4-bis(hydroxymethyl)tetramethylbenzene having a melting point of 115° C. was dissolved in 10 parts of hot cyclohexanone and the mixture filtered. 2.56 parts of a urea-melamine-formaldehyde resin (Beetle 227–8) was added and the mixture spread on tin panels and baked for 30 minutes at 150° C. The resulting films had good hardness, flexibility and good resistance to deteriorating elements.

Related films are obtained by replacing the polymeric polyether in the above process with equal amounts of each of the following: polymeric polyether of hexanetriol and 1,4-bis(hydroxymethyl)tetramethylbenzene and a polymeric polyether of ethylene glycol and 1,4-bis(hydroxymethyl)tetramethylbenzene.

I claim as my invention:

1. Hydroxy-substituted polyethers having the structure formula

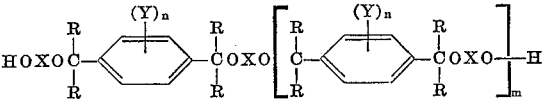

wherein Y is a monovalent hydrocarbon radical containing up to 8 carbon atoms, X is a bivalent radical of the group consisting of aliphatic hydrocarbon radicals containing up to 12 carbon atoms and hydroxy-substituted aliphatic hydrocarbon radicals containing up to 12 carbon atoms, R is a member of the group consisting of hydrogen and lower alkyl radicals, $n$ is 3 to 4 and $m$ is an integer from 0 to 50.

2. Hydroxy-substituted polyethers as defined in claim 1 wherein $m$ is an integer from 2 to 20.

3. 1,4-bis(beta-hydroxyethoxymethyl) tetramethyl benzene.

4. 1,4-bis(beta-gamma-dihydroxypropoxymethyl) tetramethyl benzene.

5. Compounds of the group consisting of (1) hydroxy-substituted polyethers of the formula

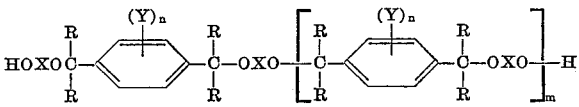

wherein Y is a monovalent hydrocarbon radical containing up to 8 carbon atoms, X is a bivalent radical of the group consisting of aliphatic and cycloaliphatic hydrocarbon radicals containing up to 18 carbon atoms and hydroxy-substituted aliphatic and cycloaliphatic hydrocarbon radicals containing up to 18 carbon atoms, R is a member of the group consisting of hydrogen and lower alkyl radicals, $n$ is an integer from 3 to 4 and $m$ is an integer from 0 to 50, and (2) esters of the aforedescribed hydroxy-substituted polyethers and acids of the group consisting of aliphatic and cylcloaliphatic monocarboxylic acids containing 4 to 18 carbon atoms and hydrocarbon dicarboxylic acids containing up to 16 carbon atoms.

6. A polyether, the repeating units of which consist of regularly alternating

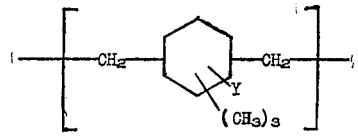

groups and

{ORO} groups, in which R is a member of the class consisting of, alkylene hydrocarbon radicals and OH substituted alkylene hydrocarbon radicals, and in which Y is selected from the group consisting of —H and —CH$_3$.

7. Compounds of the formula

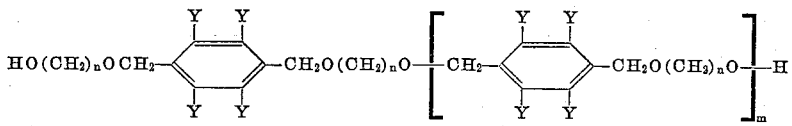

wherein Y is an alkyl radical containing up to 8 carbon atoms, $n$ is an integer from 1 to 8, and $m$ is 0 to 50.

8. Compounds of the formula

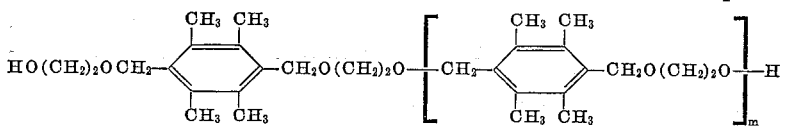

wherein $m$ is 0 to 50.

9. Compounds of the formula

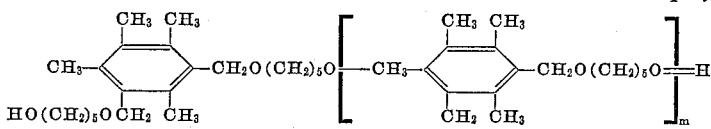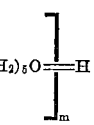

wherein $m$ is 0 to 50.

10. A polyether of the formula

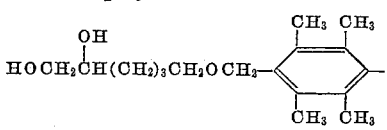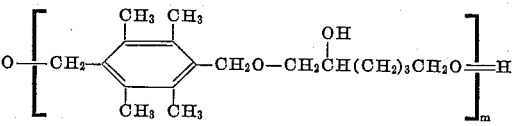

wherein $m$ is 0 to 50.

11. A process for preparing hydroxy-substituted polyethers which comprises heating and reacting at a temperature between 50° C. and 350° C. a mole of a substituted benzene of the group consisting of di(1-haloalkyl)tri(alkyl)benzenes, di(1-haloalkyl)tetra(alkyl)benzenes, di(1-hydroxyalkyl)tri(alkyl)benzenes and di(1-hydroxyalkyl)tetra(alkyl)benzenes wherein the haloalkyl groups and hydroxyalkyl groups contain up to 6 carbon atoms and the alkyl groups contain up to 8 carbon atoms, with from about 1 to 2 moles of a polyhydroxy compound of the group consisting of aliphatic and cycloaliphatic polyhydric alcohols containing no more than 18 carbon atoms.

12. A process as in claim 11 wherein the substituted benzene is a di(1-haloalkyl)tetra(alkyl)benzene wherein the haloalkyl group contains up to 6 carbon atoms and the alkyl groups contain up to 8 carbon atoms.

13. A process as in claim 11 wherein the substituted benzene is a di(1 - hydroxyalkyl)tetra(alkyl)benzene wherein the hydroxyalkyl group contains up to 6 carbon atoms and the alkyl groups contain up to 8 carbon atoms.

14. A process for preparing polyether resinous products which comprises heating at a temperature between 50° C. and 350° C. a bis(1-chloroalkyl) tetraalkylbenzene wherein the chloroalkyl groups contain up to 6 carbon atoms and the alkyl groups attached to the four ring carbon atoms contain up to 8 carbon atoms, with from 1 to 2 equivalents of a polyhydric alcohol having from 2 to 6 OH groups attached to an aliphatic hydrocarbon and containing up to 12 carbon atoms.

15. A process as in claim 14 wherein the polyhydric alcohol is ethylene glycol.

16. A process as in claim 14 wherein the polyhydric alcohol is glycerol.

17. A process as in claim 14 wherein the substituted benzene is bis(chloromethyl) tetramethyl benzene and the polyhydric alcohol is 1,5-pentane diol.

18. A process as in claim 14 wherein the substituted benzene is bis(chloromethyl) trimethyl benzene and the polyhydric alcohol is 1,2,6-hexanetriol.

19. A process for preparing polyether resinous products which comprises heating a bis(1-hydroxyalkyl) tetraalkylbenzene wherein the hydroxyalkyl groups contain up to 6 carbon atoms and the alkyl groups attached to the four ring carbon atoms contain up to 8 carbon atoms, with from 1 to 2 equivalents of a polyhydric alcohol having from 2 to 6 OH groups attached to an aliphatic hydrocarbon and containing up to 10 carbon atoms, in the presence of from .1% to 2% by weight of an acidic catalyst at a temperature of about 50° C. to 350° C.

References Cited in the file of this patent

UNITED STATES PATENTS

| | | |
|---|---|---|
| 2,139,369 | Kyrides | Dec. 6, 1938 |
| 2,654,732 | Geiser | Oct. 6, 1953 |
| 2,687,430 | Snow et al. | Aug. 24, 1954 |
| 2,814,606 | Stilmar | Nov. 26, 1957 |
| 2,843,568 | Benning et al. | July 15, 1958 |

FOREIGN PATENTS

| | | |
|---|---|---|
| 869,872 | Germany | Mar. 9, 1952 |

OTHER REFERENCES

Rhoad et al.: J. Am. Chem. Soc. 72, 2216–9 (May 1950).